United States Patent
Pezot

[11] 3,825,856
[45] July 23, 1974

[54] LASER GENERATOR FOR SINGLE TRANSVERSE MODE OPERATION

[75] Inventor: Jacques Pezot, Marcoussis, France

[73] Assignee: Commissariat a l'Energie Atomique, Paris, France

[22] Filed: Dec. 7, 1972

[21] Appl. No.: 313,186

[30] Foreign Application Priority Data
Dec. 10, 1971   France .............................. 71.44398

[52] U.S. Cl. ...................... 331/94.5 C, 350/175 GN
[51] Int. Cl. ............................................. H01s 3/05
[58] Field of Search ............. 331/94.5; 350/175 GN

[56] References Cited
UNITED STATES PATENTS
| | | | |
|---|---|---|---|
| 3,281,712 | 10/1966 | Koester | 331/94.5 |
| 3,322,026 | 5/1967 | Rigrod | 350/314 X |
| 3,680,000 | 7/1972 | Chesler et al. | 331/94.5 |
| 3,746,429 | 7/1973 | Spindel et al. | 350/314 X |

OTHER PUBLICATIONS
Stickley, IEEE Journal of Quantum Electronics, QE-2, (9), September, 1966, pp. 511–518.

Primary Examiner—Ronald L. Wibert
Assistant Examiner—R. J. Webster
Attorney, Agent, or Firm—Flynn & Frishauf; William R. Woodward

[57] ABSTRACT

A laser generator which oscillates in a single transverse mode comprises an amplifying medium placed within a resonator consisting of two oppositely facing mirrors.

Provision is made within the resonator for an optical system of revolution having an axis which is adjacent to the resonator axis and comprising a divergent lens of homogeneous absorbent material.

6 Claims, 12 Drawing Figures

LASER GENERATOR FOR SINGLE TRANSVERSE MODE OPERATION

This invention relates to laser generators which oscillate in the single transverse mode and more particularly to pilot laser generators for the delivery of light pulses which are amplified in amplifying chains.

It is known that a laser is capable of oscillating in a very large number of modes. Each oscillating mode is characterized by its frequency and by the distribution of light intensity in a transverse section plane of the beam.

The frequency range within which the modes of a laser are capable of oscillating is largely defined by the range within which the amplifying medium of said laser is capable of amplifying the radiation.

The different types of spatial distributions are, on the contrary, largely characterized by the geometry of the resonator and by the geometry of the amplifying medium.

The presence or absence of certain oscillating modes of a laser is therefore a function of the spectral behavior of the laser and of the spatial structure of its elements.

The radial distributions of the energy contained in the laser beam are of Gaussian type in the majority of cases. More precisely, the light intensity at each point of the transverse section of the laser beam is a Gaussian function of the distance from the center of the laser beam, there being assigned to this latter a function which is usually a polynomial and can have a certain number of zeros. In the most simple case, the spatial distribution of the light intensity in the transverse section plane of a laser beam is a pure Gaussian function, the polynomial being reduced to unity. In this case, the radial distribution of the light intensity is of maximum value at the center of the beam and has a bell-shaped curve as the distance from the center increases. This particularly simple mode is sometimes referred-to as the fundamental transverse mode. In general, however, the modes have a more complex distribution which can have a certain number of nullifications of intensity, either along radial lines or along concentric circles. When a laser emits a beam of light in which a number of these distributions are present, it is said that the laser operates in transverse multimode oscillation.

There corresponds to each type of spatial distribution a family of modes which have the same spatial distribution but are located at slightly different and uniformly spaced frequencies; these are the longitudinal modes. In a very general manner, a laser therefore oscillates in accordance with a double family of longitudinal modes and transverse modes.

In order that a laser should oscillate in only one of these modes, it is necessary to make use of systems known as "mode selectors." The selectors which make it possible to obtain a radiation at a single frequency are those which have properties of spectral selection (Fabry-Perot etalons or interferometers). On the other hand, the selectors which permit the possibility of selecting a transverse mode are those which possess the property of spatial selection.

The present invention relates to a laser generator which oscillates in a single transverse mode and consequently to a laser generator which is provided with a transverse mode selector. This selector is so designed that the laser should oscillate in a single type of transverse mode characterized by a particular distribution of the light energy in a transverse section plane of the laser beam. This particular distribution, which is given the most favorable conditions by means of the system in accordance with the invention, is the simplest Gaussian function referred-to above, namely: A Gaussian function which is of maximum value at the center and decreases in accordance with a bell-shaped curve as the distance from the center increases.

The advantage of lasers which oscillate in the Gaussian transverse mode is well known to those who are versed in the art. In fact, this type of distribution is particularly pure since there does not exist any nullification of light intensity in the transverse section plane of the laser beam. Moreover, the conditions of propagation of a Gaussian beam of this type are particularly advantageous: the Gaussian mode is the mode in which the beam has the smallest divergence in respect of a given aperture, in comparison with the divergence obtained in other modes which are not purely Gaussian; correlatively, when a Gaussian beam of this type is focused by means of an optical system, the focal spot obtained has minimum dimensions with respect to those obtained in the case of beams which have a more complex distribution. By means of Gaussian beams, it is therefore possible to obtain maximum energy densities in respect of constant energy emitted by the laser.

In the case in which the pulse emitted by the laser is amplified by a chain of amplifiers, it is also particularly advantageous to ensure that the control laser oscillates in the Gaussian mode. In fact, the amplifying chains are usually such that the amplification is higher at the edges of the amplifying rods than at the center of these latter. In consequence, if the control laser emits an initial mode which is not Gaussian, the edges of the beam will be more highly amplified than the center, with the result that the laser beam produced at the output of the amplifying chain will be very inhomogeneous and have the shape of a ring. On the other hand, if the beam of the control laser is a pure Gaussian function, the difference between the peripheral amplification and the axial amplification restores the homogeneity of the laser spot at the output of the amplifying stages.

In order to prevent a laser from oscillating in a plurality of transverse modes, use can be made of a diaphragm consisting of a metallic plate pierced by a hole and located within the laser cavity. As a rule, the dimensions of said hole are substantially smaller than the diameter of the amplifying rod. The intended function of the hole is on the one hand to block the light rays which are located at a substantial distance from the axis and for which the amplification is usually very high and, on the other hand, to inhibit the transverse modes which have very large dimensions in favor of modes having small dimensions for which the energy is concentrated near the axis of the laser. The Gaussian fundamental mode which it is sought to obtain is precisely a mode in which the energy is concentrated in the vicinity of the axis. The use of a diaphragm of this type therefore enhances the Gaussian fundamental mode and overcomes the defects of homogeneity of pumping of the amplifying rod. However, while this known system does in fact achieve a selection of modes, it does not permit effective use of the population inversion which is produced within the amplifying rod since the dimensions of the diaphragm are often very small with respect to the diameter of the rod. The use of this device therefore results in very low efficiency of the laser. If the diameter of the diaphragm is progressively increased, the energy emitted by the laser in the fundamental mode increases but the transverse modes of higher orders appear progressively by reason of the fact that the diaphragm no longer performs its selecting function.

Should it be desired to obtain a fundamental mode of larger diameter and consequently a higher level of energy emitted by the laser, it is therefore necessary to employ a transverse selector having a larger aperture than that of the conventional diaphragm. It is nevertheless necessary to ensure that the transverse selection should be operative. The precise aim of the invention is to propose a device which satisfies these two conditions.

More precisely, the invention is concerned with a laser generator which oscillates in the single transverse mode, comprising an amplifying medium located within a resonator constituted by two oppositely facing mirrors, characterized in that it comprises within said resonator an optical system of revolution whose axis is adjacent to the axis of said resonator and comprising a divergent lens which is fabricated from homogeneous absorbent material.

In a first embodiment, the absorbent divergent lens is associated with other transparent lenses, in particular convergent lenses, and the complete assembly is located in proximity to one of the mirrors of the laser. In order that the conditions of propagation of the laser beam within the cavity should be those which are usually encountered in a cavity formed by two plane mirrors without diaphragm, the optical system formed on the one hand by the divergent lens which may be associated with convergent lenses and on the other hand by the mirror near which said selector is placed must necessarily be equivalent to a plane mirror. This means that, if the selecting optical system possesses a certain convergence, the curvature and the position of the mirror of the resonator must be such that said mirror compensates for the convergence of the optical system.

In a second embodiment of the invention, the divergent lens is associated with other transparent convergent lenses in order to form an afocal system, in particular an afocal system having a magnification of unity. In the case just mentioned, the optical selecting system is equivalent to a plate having parallel faces and the mirror of the resonator can therefore be located in any position, its curvature being necessarily zero.

In a third embodiment, one of the mirrors constituting the laser cavity is formed by depositing reflecting coatings on the exit face of the mode-selecting optical system.

A better understanding of the invention will in any case be obtained from the following description which is given with reference to the accompanying figures, and wherein.

Figure 8A:
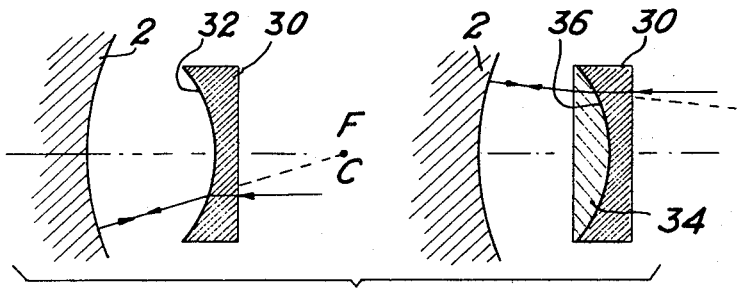
Figure 8B:
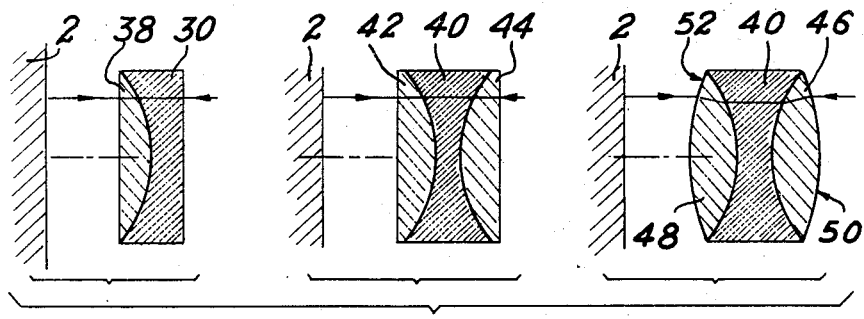
Figures 8C, 9:
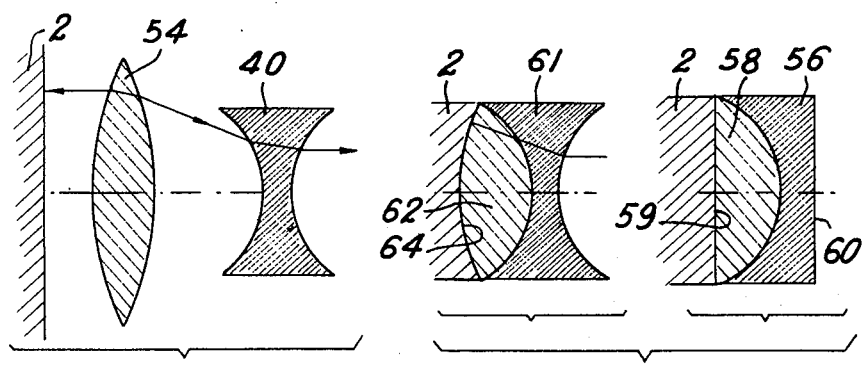

FIGS. 8a, 8b, and 8c show a few possible mode-selecting systems;

FIG. 9 shows an alternative embodiment in which one of the mirrors forming the resonator of the laser is constituted by one of the faces of the mode-selecting optical system.

Figure 1:
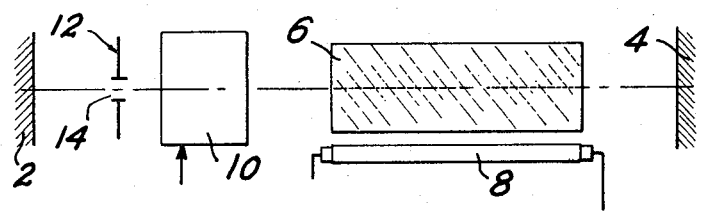
FIG. 1 is a schematic diagram of a laser equipped with a mode-selecting system with diaphragm as was known in the prior art.

In FIG. 1, there is given a simplified diagram of a laser generator which oscillates in a single transverse mode.

In this figure, a resonator of the Fabry-Perot type is constituted by a total-reflection mirror 2 and by a second semi-transparent mirror 4; there is placed in said resonator an active medium 6 associated with a pumping means such as, for example, a flash tube 8; there is also shown in this figure a device 10 which can serve if necessary and depending on the types of lasers to produce a rapid variation of the Q-factor of said resonator in order to obtain at the output of the laser a light pulse of very short duration, for example of the order of a few nanoseconds (so-called "triggered" laser operation); there is also placed within the resonator a diaphragm 12 having a small aperture 14.

The amplifying rod 6 can be either a ruby rod or a neodymium-doped glass rod or even a tank containing a liquid solution of dye. This amplifying medium is optically excited by the flash tube 8 which is suitably supplied from an electric power source (not shown in the figure). The device 10 can be either a Kerr cell or a Pockels cell. The aperture 14 of the diaphragm 12 constitutes the transverse mode selecting device.

The disadvantage of laser generators of this type which oscillate in a single transverse mode in accordance with the prior art is that it is not possible to obtain a Gaussian emergent beam of substantial width. From this it follows, for example, that with a laser generator in which a rod having a diameter of 9.5 mm is employed, the diaphragm and consequently the emergent beam have a diameter which is approximately 1.6 mm at the maximum.

Figure 2:
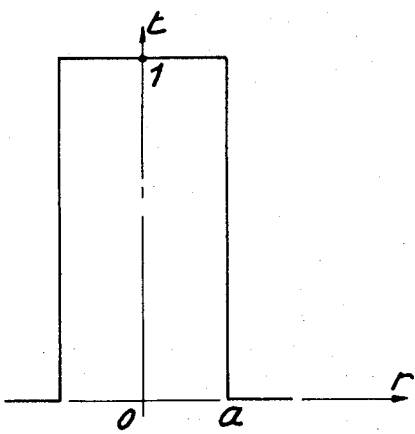
FIG. 2 shows the transmission of a diaphragm of this type as a function of the distance at the center of the system.
Figure 3A:
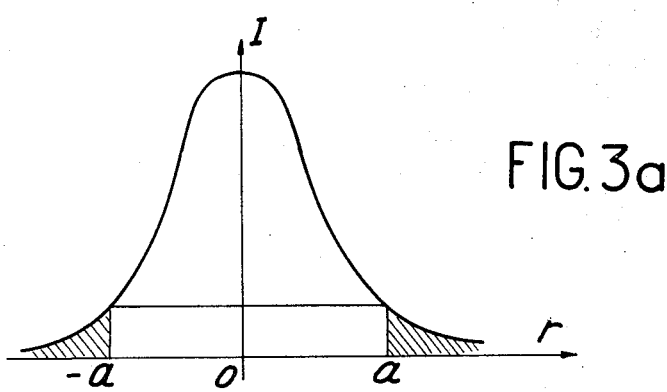
FIG. 3 shows the radial distribution of the light intensity in the case of the pure Gaussian mode (FIG. 3a) and in the case of a more complex transverse mode (FIG. 3b)
Figure 3B:
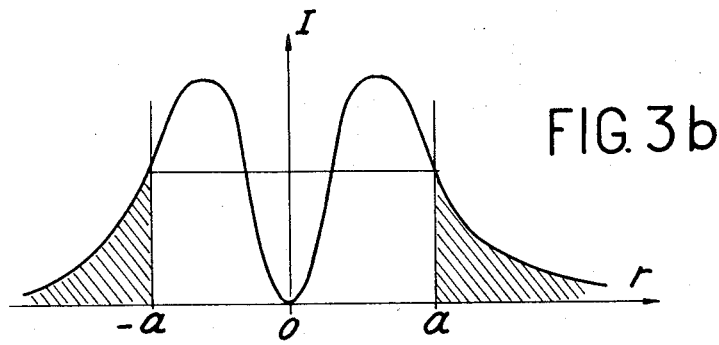
Figure 4:
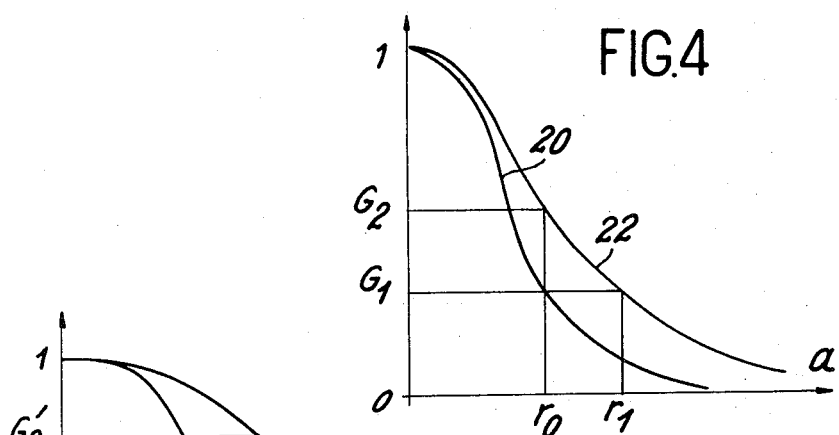
FIG. 4 shows curves which serve to explain the principle of the mode selection obtained with the device of the prior art.

The origin of the limitations encountered in the devices of the prior art will be more readily understood by referring to FIGS. 2, 3 and 4.

In FIG. 2, the distance from the center of the system has been plotted as abscissae and the transmission of light radiation by the diaphragm 12 has been plotted as ordinates. This transmission is equal to 1 in the case of an aperture corresponding to the aperture 14 and is equal to 0 at any other point.

The mode to be selected has an intensity distribution in a transverse section plane which is shown in FIG. 3a. In this figure, the distance from the center of the beam has been plotted as abscissae and the light intensity at one point has been plotted as ordinates. The variation in light intensity as a function of the distance $r$ from the center is a function which depends only on $r$ and has the well-known shape of the bell curve which is characteristic of the Gaussian function whose analytical expression is of the form: $\exp(-r^2/w^2)$. The area located between said curve and the axis of abscissae is proportional to the energy transported by this mode within the laser beam.

In FIG. 3b, there is shown by way of explanation the spatial distribution of intensity of another transverse mode which exhibits, for example, a reduction of intensity to zero at the center of the beam. The function which describes the spatial energy distribution is in this case the product of a Gaussian function of the same form as the preceding Gaussian function and of a polynomial of the variable $r$ which is cancelled when $r = 0$. The area between said curve and the axis of abscissae is again proportional to the energy transmitted by the laser beam in this oscillating mode. It has been assumed in the case of FIGS. 3a and 3b that the energies transported by the two modes are equal. In consequence, the two areas beneath the curves are equal.

The diaphragm 14 having a radius $a$ which is placed within the laser resonator cuts off the different modes in the zones located beyond $r = a$. The presence of this diaphragm within the resonator therefore results in the case of each mode in losses which are proportional to the shaded surfaces in FIGS. 3a and 3b. From the shape of these curves, it is clear that the fundamental mode of FIG. 3a will be the least disturbed by the presence of the diaphragm: hence the origin of the mode selection obtained. In all the other transverse modes which are not shown in FIG. 3, the selection will be carried out "a fortiori" inasmuch as all the transverse modes having more complex distributions than that shown in FIG. 3 have larger transverse dimensions than those of the mode of FIG. 3b.

In order that the principle of selection obtained by means of the diaphragm 14 may be more readily understood, reference will be made to FIG. 4. In this figure, the radius of the diaphragm is plotted as abscissae; the relative losses sustained by the laser beam as it passes through the diaphragm are plotted as ordinates, in the case of the Gaussian fundamental mode (curve 20) and in the case of the transverse mode of FIG. 3b (curve 22). In the case of each mode, there correspond to each aperture having a given radius $a$ losses which are shown in FIGS. 3a and 3b by the shaded zones located between $-\infty$ and $-a$ on the one hand and $a$ and $+\infty$ on the other hand. If $a$ is very short, the losses arising from the presence of the diaphragm are in the vicinity of 1. On the other hand, when the radius $a$ of the aperture is of substantial length, the losses tend towards 0. For any value of $a$, the losses sustained by the mode 3b exceed those sustained by the Gaussian fundamental mode. The curve 22 is therefore located above the curve 20.

It is first assumed that the amplifying medium is excited at a given level to which corresponds a gain $G_1$ of the amplifying medium. The conditions of oscillation of the laser are satisfied when the losses (represented by the curves 20 and 22) are lower than the gain of the amplifying medium (represented by a straight line parallel to the axis of abscissae and ordinates $G_1$). The laser can therefore oscillate only if the radius of the diaphragm is larger than a minimum value $r_0$. At this value, the laser is capable of oscillating solely in the Gaussian fundamental mode. If $a$ increases and attains the value $r_1$ at which the gain of the amplifying medium is equal to the losses sustained by the mode 3b, the laser no longer oscillates in the single Gaussian mode but oscillates simultaneously in two competitive modes which correspond to the two modes of FIGS. 3a and 3b. A laser which oscillates in a single transverse mode is therefore designed so that the radius of aperture of the diaphragm should be comprised between $r_0$ and $r_1$ in respect of a given excitation. If the diaphragm has an aperture $r_0$, the laser oscillates in a single transverse mode as long as the gain is comprised between $G_1$ and $G_2$, wherein $G_2$ is the value of the gain corresponding to the losses sustained by the transverse mode of FIG. 3b. In the case of a given diaphragm, a laser therefore oscillates in a single transverse mode only within a given range of excitation corresponding to the range $G_1$, $G_2$.

Figure 5:
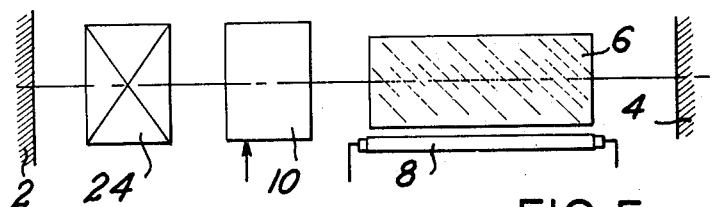
FIG. 5 is a diagram of a laser generator which oscillates in a single transverse mode and is equipped with the mode-selecting device in accordance with the invention.

The mode-selecting optical system in accordance with the invention is again placed within the cavity as illustrated in FIG. 5. In this figure, there is again shown the laser resonator constituted by the two mirrors 2 and 4, the amplifying medium 6 which is optically excited by a flash tube 8 and the device 10 which serves if necessary to obtain a very short light pulse. The present invention is concerned with the device 24, the transmission of which is shown in FIG. 6.

Figure 6:
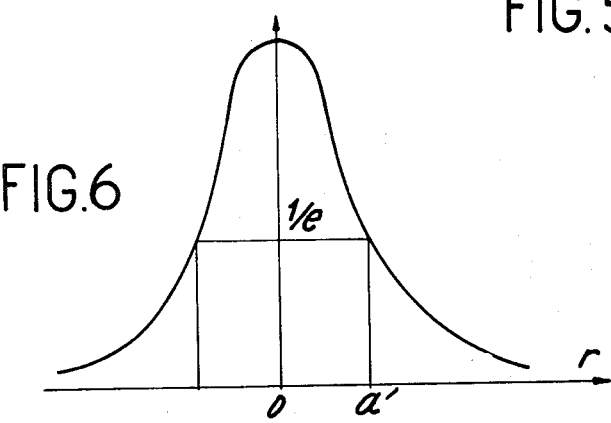
FIG. 6 shows the transmission of the mode-selecting optical system in accordance with the invention, as a function of the distance at the center of the system.

In this FIG. 6, the distance from the axis is plotted as abscissae and the transmission of the device 24 is plotted as ordinates. Said transmission is in the vicinity of 1 at the center of the system and, in contradistinction to the prior art, is a continuous decreasing function of the distance $r$.

The device 24 is so designed that said function should be close to a Gauussian as represented in FIG. 3a. This being the case, it can be understood that the optical system 24 establishes favorable conditions for the Gaussian fundamental mode of FIG. 3a at the expense of all the other modes which do not provide a Gaussian distribution and in particular at the expense of the mode in which the distribution of light intensity is that of the curve of FIG. 3b.

Since the transmission of the device 24 is a continuous decreasing function, it is relatively arbitrary to define the radius of its aperture. If the curve of transmission as a function of the distance from the center is close to the curve which represents the variations of a Gaussian function of the form $\exp(-r^2/w^2)$, the definition which can accordingly be adopted for the radius of aperture of the device 24 is the radius $a'$ such that the transmission in respect of $r = a'$ is equal to $1/e$. The radius $a'$ is known as the equivalent radius of the device 24. It can therefore be written than the transmission of the device 24 is close to that which is described by the function $\exp(-r^2/a'^2)$.

Figure 7:
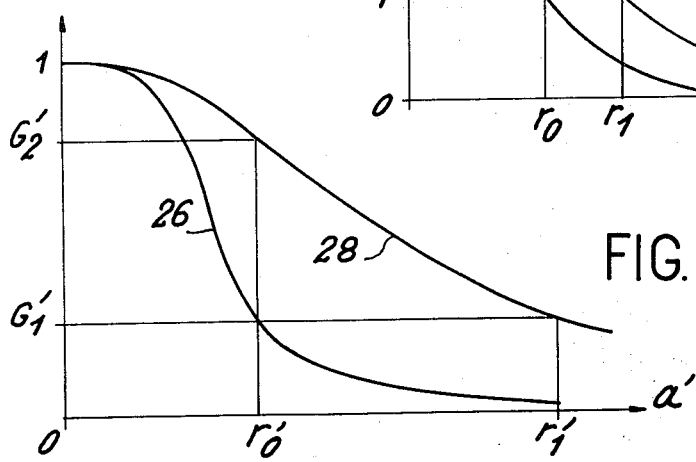
FIG. 7 shows curves which serve to explain the operation of the transverse mode selection in accordance with the invention.

The principle of selection of modes by the device 24 can be interpreted by means of curves which are similar to those of FIG. 4 and which are illustrated in FIG. 7. In this figure, the equivalent radius $a'$ of the system 24 is placed on the axis of abscissae. There are placed on the axis of ordinates on the one hand the losses sustained by the mode shown in FIG. 3a (curve No 26) and, on the other hand, the losses sustained by the mode of FIG. 3b (curve 28). When the equivalent radius $a'$ of the system 24 is very short, the losses sustained by the two modes are high and approach unity. On the other hand, when the curve of FIG. 6 is highly spread-out, which corresponds to a radius $a'$ of substantial length, the losses sustained by the two modes are small and tend towards 0. In the case of any intermediate value, the losses sustained by the mode of FIG. 3b are appreciably in excess of the losses sustained by the preferential mode of FIG. 3a. As a result, the curve 28 is located at a considerable distance above the curve 26, the difference between these two curves being very much greater than the difference which existed in FIG. 4 between the curves 20 and 22. For a given excitation of the rod 6 of FIG. 5, the amplifying medium exhibits a gain $G'_1$. The limits between which a generator of the type shown in FIG. 5 oscillates in the single fundamental mode of FIG. 3a correspond to the points of intersection of the ordinate line $G'_1$ with the curves 26 and 28. For a given device 24, that is to say for a given equivalent radius $a'$, there exists as in the case of the prior art an excitation range within which the laser oscillates in a single transverse mode. If $a'$ is equal to $r'_o$, the range aforesaid is that which is comprised between $G'_1$ and $G'_2$.

The laser which oscillates in a single transverse mode in accordance with the invention therefore has a double range within which the operation is satisfactory. However, it is apparent that this range is appreciably greater than the range which corresponds to the use of a diaphragm. Accordingly, in the case of the invention, the laser beam thus obtained in a single transverse mode can have in particular an appreciably larger diameter than that which corresponds to the laser in single transverse mode of the prior art (practically of the order of 2 to 3 times larger). The selecting system in accordance with the invention therefore permits more effective use of the excitation of the amplifying rod 6; it is thus conducive to a broader margin of safety as well as to a larger amount of energy transported by the laser beam.

An optical system having a transmission which is variable as a function of the distance from the center as shown in FIG. 6 is constructed in accordance with the invention by using a divergent lens of absorbent material.

The optical system can have different forms, a few of which are illustrated in FIG. 8 by way of explanation but not in any sense by way of limitation.

In FIGS. 8a, 8b and 8c, there are shown three preferred embodiments of an optical mode-selecting system in accordance with the invention. On the left-hand side of FIG. 8, this system is reduced to a divergent lens 30. This lens is formed of absorbent material and the curvature of the face 32 is calculated in such a manner as to ensure that the transmission of a lens of this type is a function as represented in the plot 8a, FIG. 6.

Since the lens 30 has a fairly large divergence, it is necessary to ensure that the mirror 2 of the laser resonator has a convergence such that the assembly 30 and 2 should be equivalent to a plane mirror. To this end, the center of curvature C of the mirror 2 coincides with the focal point F of the lens 30 as indicated in the left-hand portion of FIG. 8a. Should this be the case, it is apparent that a light ray which has been deviated from the axis returns along the same path after having passed twice through the lens 30 and having been reflected from the mirror 2. In this case, the assembly is therefore in fact equivalent to a single plane mirror insofar as concerns the propagation of the radiation phase. So far as the radiation intensity is concerned, it is apparent that said light ray has undergone an absorption which is a function of the thickness of the lens 30 through which the light ray has passed.

In another similar embodiment (shown on the right-hand side of FIG. 8a), the absorbent lens 30 is associated with a planoconvex lens 34, the convex face 36 of which has the same curvature as the face 32 of the divergent lens 30. The two lenses 30 and 34 are combined so that their spherical faces 32 and 36 are placed against each other either by optical polishing or by means of a suitable product.

The convergent lens 34 is fabricated from a transparent material having a refractive index which is not necessarily the same as that of the lens 36. If the two refractive indices are different, the assembly 34 and 30 is not equivalent to a plate having parallel faces but exhibits a certain degree of convergence. In this case, the mirror 2 of the laser resonator must again have a certain degree of curvature in order to compensate for the convergence of the optical selecting system. In the case shown in the figure, the covergence of the system 30 and 34 is negative but it is apparent that in some cases, and in particular if the refractive index of the lens 34 were higher than the index of the lens 30, the optical system obtained by placing the two lenses against each other would possess a convergence (convergent system). In the case just mentioned, the mirror 2 would be a convex mirror.

In all cases, the center of curvature (virtual or real) of the mirror 2 must be caused to coincide with the focal point (real or virtual) of the mode-selecting optical system.

In a second embodiment, the mirror 2 of the resonator is plane. This entails the need to ensure that the mode-selecting optical system is so designed that its convergence should be zero and that it should be equivalent from the point of view of propagation of the radiation phase to an afocal system and in particular to a plate having parallel faces. A system of this type is shown in the left-hand portion of FIG. 8b, wherein the reference numeral 2 designates the mirror of the laser resonator and the numeral 30 designates the divergent planoconcave lens of absorbent material; the reference numeral 38 designates a planoconvex convergent lens having a refractive index equal to that of the convergent lens 30. In this case, the assembly 30 and 38 is in fact equivalent to a plate having parallel faces and a light ray as shown in this figure does not undergo any deviation as it passes through a system of this type.

It is possible to devise different systems such as those illustrated in the two other diagrams of FIG. 8b. In systems of this type, the divergent lens 40 is a symmetrical biconcave lens of absorbent material; this lens is associated with two planoconvex convergent lenses 42 and 44, the convex faces of which have the same curvature as the concave faces of the divergent lens 40. The three lenses are mounted with their spherical surfaces in contact and their refractive indices are all equal. In consequence, the assembly is equivalent to a plate having parallel faces. In some cases, it is difficult to find glasses which have the same refractive index. If the differences between the indices are small, this effect can be corrected by giving a slight curvature to one of the faces of the convergent lenses. This is shown in the right-hand diagram of FIG. 8b; in this diagram, the divergent lens 40 of absorbent material is placed against two biconvex convergent lenses 46 and 48. The convergent lenses 46 and 48 have a spherical face, the curvature of which is equal to that of the concave faces of the lens 40. The three lenses 40, 46, 48 are therefore mounted together with these spherical faces in contact with each other. If the refractive index of the lenses 46 and 48 is slightly lower (or higher) than the index of the divergent lens 40, the outer faces 50 and 52 of the lenses 46 and 48 respectively have a slight convexity, with the result that the assembly of the three lenses has zero convergence.

In all the cases of FIG. 8b, the equivalent system is a plate having parallel faces but one can conceive of an optical selecting system which would be an afocal system having a magnification other than unity. This is shown in FIG. 8c. This figure illustrates a particular embodiment of the invention in which a biconcave divergent lens 40 of absorbent material is associated with a biconvex convergent lens 54 of transparent material. The respective position of these two lenses and the curvature of their faces are such that the assembly of lenses 40 and 54 forms an afocal optical system having a magnification which is different from unity. In this case, the mirror 2 of the laser resonator is again a plane mirror.

In all the embodiments which have just been described, the mirror 2 of the laser resonator was separated from the mode-selecting optical system. In another embodiment of the invention, said mirror can be incorporated with the selecting optical system as illustrated in FIG. 9. In the right-hand portion of this figure, there is shown a particularly simple system comprising a planoconcave divergent lens 56 of absorbent material; this lens is associated with a planoconvex convergent lens 58 which has the same refractive index as that of the divergent lens 56 and the spherical face of which has the same curvature as that of the lens 56. These two lenses are mounted with their spherical faces in contact and the mirror 2 of the resonator is constructed by making use of the plane face 59 of the planoconvex lens 58 as a support. To this end, reflecting coatings are deposited directly on said plane face 59.

The assembly 56, 58 and 2 is accordingly presented in the form of a compact single optical system.

A further example of construction of a compact system of this type is shown on the left-hand side of FIG. 9. In this figure, a biconcave divergent lens 61 of absorbent material is associated with a biconvex lens 62 of transparent material, the refractive index of which is equal to that of the divergent lens 61. The outer face 64 of the biconvex lens 62 is employed in order to form the spherical mirror 2 by means of reflecting coatings which are directly deposited thereon.

In some cases, the presence of plane faces within the laser resonator is liable to give rise to parasitic oscillations caused by the presence of a large number of partial resonators. In this case, the optical system having plane faces must be slightly inclined with respect to the principal axis of the resonator. The angle of inclination is of the order of a few minutes of arc. In the case of the systems of FIG. 9 in which the mirror of the resonator is an integral part of the selecting device, this parasitic resonance effect can be prevented by providing the front face 60 of the divergent lens 56 with antireflection coatings which adapt the index of refraction of air to that of the lens 56.

It is apparent that the different embodiments which have just been described in connection with FIGS. 8 and 9 do not constitute an exhaustive list of the possible embodiments of the invention. Anyone versed in the art can devise other combinations of lenses comprising at least one absorbent divergent lens associated with transparent convergent lenses and with mirrors which would not constitute any departure from the scope of the invention.

What we claim is:

1. A laser generator comprising:
   a laser medium located within a resonator defined by two oppositely facing mirrors and having a main longitudinal axis;
   means for energizing said laser medium to establish a laserable inversion of energy states thereof to give rise to a stimulated emission, and
   means for selecting a single transverse mode of substantial width comprising attenuation means positioned on said axis between said laser medium and one of said mirrors for providing absorption of said stimulated emission that increases continuously with increasing radius from said axis.

2. A laser generator according to claim 1 in which said attenuation means includes a divergent lens made of a homogeneous material which is absorbent for said stimulated emission.

3. A laser generator according to claim 2 in which the assembly of said divergent lens and that one of said mirrors which is nearer said lens is optically equivalent to a plane mirror.

4. A laser generator according to claim 2 in which there is provided at least one transparent convergent lens positioned on said axis between said laser medium and that one of said mirrors which is nearer to said divergent lens, the assembly of said divergent lens, said convergent lens and said nearer mirror being optically equivalent to a plane mirror.

5. A laser generator according to claim 4 in which the assembly of said divergent lens and said transparent convergent lens constitutes an afocal system, and in which said nearer mirror is a plane mirror.

6. A laser generator according to claim 1 in which said means for energizing said laser medium are such as to cause said laser to operate in the $TEM_{00}$ transverse mode.

* * * * *